(12) United States Patent
Zhang et al.

(10) Patent No.: US 12,275,543 B2
(45) Date of Patent: Apr. 15, 2025

(54) APPARATUS, SYSTEM AND METHOD FOR FORMULATING PERSONALIZED FORMULA PRODUCT

(71) Applicant: Chenguang Zhang, Beijing (CN)

(72) Inventors: Chenguang Zhang, Beijing (CN); Jingxian Zhang, Beijing (CN)

(73) Assignee: Chenguang Zhang, Beijing (CN)

( * ) Notice: Subject to any disclaimer, the term of this patent is extended or adjusted under 35 U.S.C. 154(b) by 0 days.

(21) Appl. No.: 17/920,831

(22) PCT Filed: Jun. 22, 2021

(86) PCT No.: PCT/CN2021/101379
§ 371 (c)(1),
(2) Date: May 23, 2023

(87) PCT Pub. No.: WO2021/213554
PCT Pub. Date: Oct. 28, 2021

(65) Prior Publication Data
US 2024/0383625 A1 Nov. 21, 2024

(30) Foreign Application Priority Data

Apr. 23, 2020 (CN) .......................... 202010326779.1
Apr. 23, 2021 (CN) .......................... 202110445410.7

(51) Int. Cl.
*B65B 1/00* (2006.01)
*B65B 1/12* (2006.01)
(Continued)

(52) U.S. Cl.
CPC .................. *B65B 1/12* (2013.01); *B65B 1/40* (2013.01); *B65B 43/52* (2013.01)

(58) Field of Classification Search
CPC .............. B65B 1/12; B65B 1/40; B65B 43/52
(Continued)

(56) References Cited

U.S. PATENT DOCUMENTS

| 2018/0075506 A1* | 3/2018 | Burkhard ............... B65G 23/23 |
| 2018/0292425 A1 | 10/2018 | Lapham et al. |
| 2019/0242916 A1* | 8/2019 | Guarracina ............ B25J 9/1676 |

FOREIGN PATENT DOCUMENTS

| CN | 1942392 A | 4/2007 |
| CN | 101592927 A | 12/2009 |

(Continued)

*Primary Examiner* — Jacob A Smith
(74) *Attorney, Agent, or Firm* — Bayramoglu Law Offices LLC

(57) ABSTRACT

An apparatus, system, and method used for preparing a customized recipe product are provided. The apparatus includes a control system and a plurality of raw material units and conveying mechanisms. The plurality of raw material units are used for containing different raw materials. Each raw material unit contains a raw material bin, a material discharge port, and a material feeding mechanism. The control system generates a preset procedure on the basis of a customized recipe, and, according to said preset procedure, controls the conveying mechanisms and the material feeding mechanisms in the relevant raw material units of the preset program, until the preset procedure is completed so that a material receiving container receives the required raw materials. The apparatus can provide more targeted customized recipe products for individual needs.

21 Claims, 7 Drawing Sheets

(51) Int. Cl.
*B65B 1/40* (2006.01)
*B65B 43/52* (2006.01)

(58) Field of Classification Search
USPC .......................................................... 53/239
See application file for complete search history.

(56) References Cited

FOREIGN PATENT DOCUMENTS

| | | | | |
|---|---|---|---|---|
| CN | 105564675 | A | * | 5/2016 |
| CN | 108710385 | A | | 10/2018 |
| CN | 109433045 | A | | 3/2019 |
| CN | 109846389 | A | | 6/2019 |
| CN | 209618397 | U | * | 11/2019 |

* cited by examiner

APPARATUS, SYSTEM AND METHOD FOR FORMULATING PERSONALIZED FORMULA PRODUCT

CROSS REFERENCE TO THE RELATED APPLICATIONS

This application is the national phase entry of International Application No. PCT/CN2021/101379, filed on Jun. 22, 2021, which is based upon and claims priority to Chinese Patent Application No. 202010326779.1, filed on Apr. 23, 2020, and Chinese Patent Application No. 202110445410.7, filed on Apr. 23, 2021. This application incorporates by reference the International Application No. PCT/CN2021/101379, filed on Jun. 22, 2021.

TECHNICAL FIELD

The present invention relates to the technology of food processing, and particularly relates to an apparatus, a system and a method for formulating a personalized formula product.

BACKGROUND

The proverbial saying "You are what you eat" indicates the importance of eating. Everyone deserves nutritional supplements that optimally match his/her metabolic pattern. Eating constitutes a prerequisite for life-sustaining activities, and reasonable nutritional supply is one of the most important means to maintain a healthy life. The uniqueness of each individual's genetic codes determines the uniqueness of the metabolic pattern, so the nutritional supply required is also unique, which is a basic principle of genetic metabonomics. Meanwhile, each individual requires a supply of different nutrients commensurate with his/her actual needs, depending on the environment one lives in, his/her age, gender and health status.

In order to provide accurate personalized nutrition, it is necessary to formulate various ingredients of nutritional products in precise proportions, that is, to accurately adjust the percentage of the contents of various ingredients (such as carbohydrates, proteins, fats, inorganic salts, trace elements, vitamins, functional enhancement elements and additives) in nutritional products. The content ratio of some ingredients in nutritional products may range from 1/1,000 to 1/10,000 of a gram, or even lower. For example, the daily intake of vitamins in a human body ranges from micrograms to milligrams. In nutritional products, these trace ingredients often play important roles in health, and the precise formulation of these trace nutrients in nutritional products is the key to whether the nutritional products can achieve precise provision of personalized nutritional ingredients. Existing nutritional supplements, such as infant formula milk powder and similar formula nutritional products, are mass-produced through industrialization to obtain acceptable manufacturing costs by sacrificing personalization. For example, one-time material mixing is performed on a scale of tons, then the materials are sub-packaged, and each package usually weighs within a range of a few grams to several kilograms to satisfy an individual's intake for several weeks at a time.

As mentioned above, for the industrial formulation of nutritional products, one-time material mixing is usually performed on a scale of tons, whereas the demand of each individual is measured on a scale of kilograms within a shelf life of food, so the industrial formulation method of nutritional products cannot achieve the precise personalized nutritional formulation for each individual. However, personalized nutritional formula is beneficial to the health of consumers. Therefore, populations are roughly classified by the field of industry, and specific formula products are provided to the classified populations to partially meet their needs. For example, infant milk powder is formulated according to age groups, which is the maximum degree of personalization that can be achieved by the nutritional products manufactured by industrialized mass production. However, from a nutritional point of view, as each individual's metabolic pattern is different, better nutritional supplementation effects can be obtained to better meet the consumers' needs if more targeted personalized formula products are provided.

However, how to formulate nutritional products according to the customer's personalized formula conveniently, quickly and precisely at a lower cost has always been a challenge for the promotion of personalized nutrition.

SUMMARY

The objective of the present invention is to provide an apparatus capable of precisely formulating formula products according to a personalized formula, and in particular to an apparatus and a method for providing precisely formulated personalized products suitable for intake for one time to several weeks according to customers' personalized demands (based on their respective genetic characteristics, metabolic patterns, physiological parameters and ages); in order to achieve the objective, the present invention provides an apparatus, a system and a method for precisely formulating a personalized formula product for customers, and the technical solutions are as follows:

an apparatus for formulating a personalized formula product, wherein the apparatus includes a control system, a plurality of raw material units and a conveying mechanism; wherein the plurality of raw material units are used to hold different raw materials; each raw material unit includes a raw material bin, an outlet and a feeding mechanism; while in use, the plurality of raw material units are arranged in a manner that the raw material units can be identified by the control system;

the feeding mechanism is used to transfer the raw material from the raw material bin to the outlet and then into a material receiving container under the control of the control system;

each of the raw material units is configured with a respectively independent outlet, that is, the outlets of the raw material units are separated from each other;

the conveying mechanism is used to convey the material receiving container or the plurality of raw material units and is configured to be controlled by the control system, and under the control, the conveying mechanism enables the material receiving container to relatively move to the position of the outlet of any of the raw material units; and the control system is used to generate a preset program based on a personalized formula product and according to the preset program control the conveying mechanism and the feeding mechanisms in the raw material units related to the preset program; the control includes enabling the material receiving container to relatively move to the outlet of one of the related raw material units, and enabling the feeding mechanism of the related raw material unit to supply a required amount of raw material to the material receiving container; then enabling the material receiving container to relatively move to the outlet of another raw material unit related to the preset program, and enabling the feeding mechanism of the another related raw material unit to supply a required amount of raw material to the material receiving container; and keeping on the operation until the preset program is completed.

In the present invention, raw material outlets of the plurality of raw material units are designed to be independent of each other. In this way, raw materials excluded from a formula can be effectively avoided from being brought into the formula, and there will be free of impurity contamination, thereby ensuring that the personalized formula product meets quality requirements. In order to ensure this, in the apparatus of the present invention, the conveying mechanism is designed. The conveying mechanism is controlled by the control system and can relatively move the material receiving container to the outlet of any raw material unit, so as to meet the requirements of different preset programs.

The preset program refers to a program generated according to a customer's personalized formula which is provided by the customer, or a personalized formula generated according to the results obtained by other related testing equipment or testing institutions, such as a formula of a customer-specific health care product or nutritional product generated based on the results obtained by a hospital, physical examination institution, gene sequencing institution or blood glucose and blood pressure testing instrument.

The conveying mechanism in the present invention is a mature mechanical control technology. For example, the apparatus of the present invention is used for a milk manufacturer, and a streamline tract of the milk manufacturer's canning production line may be adopted as the conveying mechanism. The conveying mechanism required by the application in other scenarios may also be realized easily by the prior art.

The apparatus of the present invention has a plurality of raw material units. The "related raw material units" mentioned in various schemes of the present invention are involved in the plurality of raw material units, but the specific raw material units involved depend on the personalized formula corresponding to the preset program adopted when the apparatus operates. Similarly, the related raw material mentioned depends on the personalized formula corresponding to the preset program adopted when the apparatus operates.

Preferably, each of the raw material units further includes an identification unit;
the conveying mechanism is of a crawling transmission structure, a plurality of material receiving container placement positions are arranged on the conveying mechanism, and each of the material receiving container placement positions has a unique location label to be identified by the identification unit; the conveying mechanism is used to, under the control of the control system, enable the material receiving container in the material receiving container placement position to move to the outlet of one raw material unit, and further move to the outlet of the next raw material unit after the material receiving container receives the material;
the control system is used to:
designate a material receiving container placement position for each personalized formula, and extract a location label thereof; generate a corresponding preset program based on each personalized formula;
the preset program contains information of related raw material units, preset feeding amount information of each related raw material unit, and labels of the material receiving container placement positions;
according to the preset program, control the conveying mechanism to enable the material receiving container in the designated material receiving container placement position to advance and pass through each raw material unit, and identify the related raw material unit through the identification unit; and control the feeding mechanism in the related raw material unit to supply a preset feeding amount of raw materials to the material receiving container when the material receiving container meets the related raw material unit.

Preferably, a load-bearing range of the plurality of raw material units may vary;
the load-bearing range of each raw material unit for solid raw materials is independently selected from "less than 20,000 kg, less than 10,000 kg, less than 5,000 kg, less than 1,000 kg, less than 100 kg, less than 80 kg, less than 60 kg, less than 40 kg, less than 20 kg, less than 10 kg or less than 5 kg";
the load-bearing range of each raw material unit for liquid raw materials is independently selected from "less than 100,000 L, less than 50,000 L, less than 20,000 L, less than 10,000 L, less than 7,000 L, less than 5,000 L, less than 500 L, less than 1,000 L, less than 500 L, less than 300 L, less than 150 L, less than 100 L, less than 70 L, less than 50 L, less than 30 L, less than 20 L, less than 10 L or less than 5 L".

Preferably, a capacity range of each raw material unit is 10-10,000 times of a daily recommended amount of the corresponding raw material, and preferably 10-3,000 times.

Preferably, a conveying range of the conveying mechanism is configured such that it is allowed to increase or decrease the number of raw material units.

Material Mixing Mechanism, Packaging Mechanism

In some embodiments of the apparatus, wherein the apparatus further includes a material mixing mechanism, wherein the material mixing mechanism is configured to mix the raw materials received by the material receiving container according to the preset program under the control of the control system. An example is as shown in FIGS. 2A-2B.

The material mixing mechanism is selected from a propeller agitator, a magnetic stirrer, a vibration mixer, an ultrasonic mixer and a flapping homogenizer.

The apparatus of the present invention is used for formulating personalized formula products, and the material mixing mechanism is added to provide customers with higher-quality formula products. The mixing step is quite necessary especially for personalized formula products containing a wide variety of raw materials and significantly different usage amounts, such as personalized formula milk powder and nutritional supplements. But the mixing step is not required in all cases.

In an optional embodiment, the material mixing mechanism is arranged in the path of conveying the material receiving container to mix the raw materials in the material receiving container in the process of receiving and conveying or mix the raw materials in the material receiving container after all related raw materials are received.

In combination with the previous optional embodiment, preferably, the material mixing mechanism is configured as a part of the conveying mechanism, and more preferably, the material mixing mechanism is arranged in the material receiving container placement position on the conveying mechanism; a material mixing mechanism is arranged in each of the material receiving container placement positions to mix the raw materials in the material receiving container during or after material being received.

In another optional embodiment, the material mixing mechanism has a material receiving container load-bearing structure, used to accommodate the material receiving container; or the material mixing mechanism is configured to include the material receiving container.

In combination with any of the above-mentioned optional embodiments, optionally, the material mixing mechanism is configured to mix the raw materials in the material receiving container in a contactless manner; alternatively, the material mixing mechanism is configured to stir the raw materials in the material receiving container.

In combination with any of the above-mentioned optional embodiments, the material mixing mechanism further includes a packaging unit, used to package the material receiving container after receiving all the related raw materials.

An Embodiment for a Weighing Device to Achieve Closed-Loop Control

Any of the above-mentioned apparatuses, wherein
the apparatus further includes a weighing device, used to measure changes in the weight of a related raw material, and is configured to send weighing data to the control system in real time; the control system controls the feeding mechanism in the corresponding related raw material unit based on the weighing data of the related raw material. An example is as shown in FIGS. 3A-3B.

In a group of optional embodiments, the weighing data refer to changes in the weight of raw materials in the material receiving container;
the weighing device is configured to begin to weigh the weight increase data of the related raw material in the material receiving container when the material receiving container relatively moves to the position of the outlet of the related raw material unit, and send the data to the control system in real time; when a difference between the weight increase data and a required quantity value of the related raw material reaches an error within an allowable range, the control system closes the feeding mechanism in the current related raw material unit and relatively move and convey the material receiving container to the outlet of the next related raw material unit. An example is as shown in FIG. 3A.

In combination with the previous optional embodiment, a preferred scheme is as follows: in the apparatus, the plurality of raw material units are arranged in fixed positions, the conveying mechanism is used to convey the material receiving container to the outlets of various related raw material units under the control of the control system; the weighing device as a part of the conveying mechanism is arranged in the material receiving container placement position. An example is as shown in FIGS. 3A-3B.

In combination with the previous optional embodiment, another preferred scheme is as follows: the weighing device is independent of the conveying mechanism.

When the apparatus is operating, the material receiving container may be put on the apparatus, for example, the weighing device may be either an independent electronic scale, or arranged at the bottom of the material receiving container as a part of the material receiving container; no matter which scheme is adopted, the weighing device is configured to be controlled by the control system, and the weighing device can reset the previous data before receiving a new related raw material, then start to weigh a new change in weight, and send the weighing data to the control system.

In another group of optional embodiments, the weighing data refer to a change in the weight of raw materials in the raw material units;
the weighing device is used to weigh the weight decrease data of the related raw material in the related raw material unit when the material receiving container relatively moves to the position of the outlet of the related raw material unit, and send the data to the control system in real time; when a difference between the weight decrease data of the related raw material and a required quantity value of the related raw material reaches an error within an allowable range, the feeding mechanism is closed, and the material receiving container is relatively moved and conveyed to the outlet of the next related raw material unit. An example is as shown in FIG. 3B.

In combination with the previous optional embodiment, another preferred scheme is as follows: the weighing device is configured to be associated with the raw material units. For example, one of this kind weighing device may be arranged in the bottom position of each raw material unit, or the plurality of raw material units may share one weighing device. No matter which scheme is adopted, the weighing device is configured to be controlled by the control system, and the weighing device can reset the previous data before the feeding mechanism of a new related raw material unit is started, then start to weigh a new change in weight, and send the weighing data to the control system.

In combination with any of the above-mentioned closed-loop control embodiments, preferably, the weighing accuracy of the adopted weighing device reaches 1/1,000, 1/10,000, 1/100,000 or 1/1,000,000.

All the above schemes may achieve the objective of high-precision mixing by sending to the control system the change in the weight detected by the weighing device to control the feeding mechanism, namely achieving the closed-loop control. The feeding unit may be driven by a stepping motor, a servo motor or various motors with code feedback control, so as to achieve a better and convenient control.

Scheme of Controlling the Feeding Amount by the Operating Quantity, Operating Time or Operating Speed of the Motor and the Feeding Mechanism The present invention may also be independent of the closed-loop control under the control of the weighing device. The required feeding amount is achieved by controlling the operating quantity or operating speed of the feeding mechanism through the preset program, and this manner allows the apparatus to formula a plurality of formula products at the same time. The details are described as follows:

Any of the above-mentioned apparatuses, wherein
for the raw material unit used for solid raw materials, the feeding mechanism includes a feeder and a driving device thereof; and
for the raw material unit used for liquid raw materials, the feeding mechanism is selected from, but is not limited to a metering pump, a peristaltic pump, a diaphragm pump and a rotary vane pump.

In an optional embodiment, preferably, in the apparatus, at least two, three, four, five or all feeding mechanisms in the plurality of raw material units have different feeding accuracy.

As shown in FIG. 5, different raw material units are of different sizes according to the usage amounts (large amount, moderate amount or small amount) of the contained raw materials, and especially the specifications of the feeders of these raw material units are required to meet the feeding accuracy requirement.

In combination with the previous optional embodiment, preferably, the feeding mechanism of each of the raw material units is independently configured to have a feeding accuracy of 0.01-1 g, and preferably 0.1 g or 1 g.

In an optional embodiment, preferably, the feeding mechanism is a screw feeder;
  a thread pitch of the screw feeder of each of the raw material units is independently selected from values from 0.1 mm to 100 mm, and preferably values from 1 mm to 50 mm.

In an optional embodiment, preferably, the feeding mechanism is a screw feeder;
  a screw diameter of the screw feeder of each of the raw material units is independently selected from values from 0.1 mm to 100 mm, and preferably values from 1 mm to 50 mm.

In order to reach the feeding accuracy, those skilled in the art may select a satisfactory screw feeder from the existing products.

Based on the above-mentioned optional embodiment, preferably, the driving device is a motor. For example, the driving device is, but is not limited to, a stepping motor or a servo motor that can control the rotating time, rotating speed or rotating angle.

Extending Schemes

According to any of the above-mentioned apparatuses, wherein the apparatus further includes primary raw material tanks connected with different raw material units, and raw materials are supplemented in batches to each of the raw material units from the primary raw material tanks. Preferably, the primary raw material tank is connected with the raw material unit through a supplementing pipeline. An example is as shown in FIG. 6.

According to any of the above-mentioned apparatuses, wherein the apparatus can interact information with a cloud data control center through a network to acquire and store personal data authorized by customers, as well as personalized formula recommended based on the personal data;
  the personal data include, but are not limited to, body height, body weight, blood type, genes, age, allergen, taste preference and specific physiological test data;
  the personalized formula includes, but is not limited to, formula for infant milk powder, formula for infant complementary food, formula for dietary additives, and formula for beverages;

According to any of the above-mentioned apparatuses, wherein the apparatus further includes a printing unit, used to print information related to the formulated product for customers.

A system for formulating a personalized formula product, wherein
  the system includes at least one set of the above-mentioned apparatuses connected to interact information with a cloud data center through a network; preferably, the system is configured to:
  allow a customer to create an account in the system, upload the formula of a personalized formula product or upload the personal information for generating the formula of the personalized formula product, and store the information of all previous personalized formula products (including but not limited to: formula, date of formulation, formulation quantity of corresponding physiological data, and video information of formulation process);
  and allow the customer or a service provider authorized by the customer to acquire the formula based on the personalized formula product from the at least one set of the apparatuses included in the system and generate the preset program to control the apparatus, so as to formulate the personalized formula product of the customer. An example is as shown in FIG. 7.

The system further includes one or more of a metabolism measurement instrument, a gene testing instrument and a biochemical measurement instrument, wherein these instruments are connected with the system through the network to store and send the testing data of the customer according to a customer instruction, and generate a personalized formula for the customer. An example is as shown in FIG. 7.

Usage of the Apparatus

A method for formulating a personalized formula product, wherein any of the above-mentioned apparatuses is adopted, and,
  (1) provide the apparatus with a personalized formula;
  (2) the apparatus generate a preset program based on the personalized formula;
  (3) provide the apparatus with a material receiving container; start the apparatus, the control system controls, according to the preset program, the conveying mechanism and the feeding mechanisms in the raw material units related to the preset program; enables the material receiving container to relatively move to the outlet of one of the related raw material units, and enables the feeding mechanism of the related raw material unit to supply a required amount of raw material to the material receiving container; then enables the material receiving container to relatively move to the outlet of another related raw material unit of the preset program, and enables the feeding mechanism of the another related raw material unit to supply a required amount of raw material to the material receiving container; and keep on the operation until the preset program is completed.

In a preferred embodiment, the preset program includes an operating quantity or operating speed of the feeding mechanism set based on the required amount of the related raw material in the personalized formula.

In a scheme that the feeder is a screw feeder, the operating quantity refers to a number of rotations of the screw feeder, and the operating speed refers to a rotating speed of the screw feeder.

In combination with the previous preferred embodiment, preferably, the control system enables the material receiving container to stay at the outlet of each raw material unit for the same period of time, and controls to start the feeding mechanism in the related raw material unit to operate at the preset operating quantity or operating speed, so as to achieve the required feeding amount of each related raw material.

In combination with the previous preferred embodiment, preferably,
  a plurality of personalized formulas are provided to the apparatus, and the apparatus generates a plurality of preset programs based on the plurality of personalized formulas; a corresponding material receiving container is provided for each personalized formula;
  the plurality of material receiving containers were simultaneously arranged on the conveying mechanism in sequence, and the apparatus is started;
  the conveying mechanism simultaneously conveys the plurality of material receiving containers, and the plurality of material receiving containers stay at the outlets of various raw material units for the same period of time and then continues to advance;

when the material receiving container corresponding to one preset program advances to the outlet of the related raw material unit, the control system controls to start the feeding mechanism to operate at the preset operating quantity or operating speed, so as to achieve the required feeding amount of the related raw material; and when the material receiving container advances to the outlet of an unrelated raw material unit, the feeding mechanism will not be started.

In an optional embodiment, the method further includes acquiring the personalized formula authorized by a customer or provided by a customer, and generating the personalized control program for controlling the apparatus based on the personalized formula.

In an optional embodiment, the method includes the system including at least one set of the above-mentioned apparatuses connected to interact information with a cloud data center through a network;

a data storage space is provided in the apparatus to:

allow a customer to create an account, upload a personalized formula or upload the personal information for generating a personalized nutritional formula, and store the information of all previous personalized nutritional formula products (including but not limited to: personalized formula, date of formulation, formulation quantity, and video information of formulation process);

and allow the customer or a service provider authorized by the customer to acquire the personalized nutritional formula from the at least one set of the apparatuses included in the system and generate the personalized control program to control the apparatus, so as to formulate the personalized nutritional formula product of the customer.

In an optional embodiment, wherein the related raw material contained in a part of the raw material units is one raw material or a mixture of multiple raw materials.

For example, trace element raw materials and main nutritional raw materials are mixed; owing to an extremely low daily demand for the trace elements, it is very difficult to reach the accuracy for single feeding, and proportional accurate feeding of trace element raw materials and main nutritional raw materials can be achieved after the trace element raw materials are mixed with the main nutritional raw materials in proportion. Explanation of terms:

The relative movement mentioned in the present invention refers to the relative displacement of two objects caused by the movement of either of the two objects. In the present invention, the conveying mechanism enables the material receiving container to switch to the outlets of different raw material units by conveying the raw material units or the material receiving container; a plurality of raw material units may stay in fixed positions, the material receiving container is successively conveyed to the outlets of the formula-related raw material units to complete accurate feeding of the required amount of each raw material, as shown in FIGS. 1-3, 5 and 6; or the material receiving container does not move, the conveying mechanism is controlled to convey the raw material units, so that the outlets of the plurality of raw material units related to the formula successively move to the top of the material receiving container to complete the accurate feeding of the required amount of each raw material, as shown in FIG. 4.

The No. 1, 2, 3, 4 . . . N raw material units mentioned in the present invention are not intended to give fixed numbers to the raw material units, but mean that according to the feeding sequence generated in the personalized control program, under the control of the control system, the conveying mechanism successively conveys the material receiving container to the outlets of the related raw material units to receive the required amount of raw materials; or the conveying mechanism moves the outlets of the raw material units successively to the material mixing unit to complete the accurate feeding of the required amount.

The related raw material unit refers to a raw material unit corresponding to a required raw material based on a personalized formula of a customer.

The "customer" mentioned in the present invention refers to a direct user of the personalized formula product.

The raw material unit refers to an apparatus for storing raw materials; a single raw material or simply mixed nutrient raw material is stored in the raw material bin of the raw material unit. Each raw material unit includes a raw material bin, an outlet and a feeding mechanism; while in use, the plurality of raw material units in the apparatus are arranged in a manner that the raw material units can be identified by the control system; each raw material unit is configured with the respectively independent outlet, that is, the outlets of the raw material units are separated from each other; the material made of the raw material unit includes, but is not limited to, plastics, metal and rubber, and the shape includes, but is not limited to, funnel shape, taper and other industrialized conventional shapes.

The feeding mechanism refers to an apparatus capable of quantitatively transferring the raw material from the raw material bin to the outlet and then into the material receiving container based on the control of the control system. It may be, but is not limited to, various common feeding devices, such as vessel, screw (auger), belt or a combination thereof. Moreover, the feeding mechanism is accompanied with a driving device, such as various motors and mechanical devices. If a liquid material is conveyed, various metering pumps and peristaltic pumps may be adopted.

The material receiving container is a vessel for holding a mixture of various raw materials, and different raw materials are moved from the raw material bin to the material receiving container through the feeding device. The material receiving container may be a reusable vessel, the received raw materials are then transferred into a final sales vessel and packaged for sales, such as various funnel-shaped vessels and material mixing bucket. The shape of the material receiving container is circular, which is convenient for stirring and mixing. The material receiving container is preferably a disposable vessel. After materials are mixed in the disposable vessel, the disposable vessel is then packaged as the whole or a part of the final sales package; the advantages in this way are that cross contamination may be prevented and the requirement for personalized nutrition can be met better. Either a common columnar vessel made of plastic or metal in the market, or a wild-mouth bottle may be used; besides, various flexible bags may also be used for packing the material mixing box if an external support is provided.

The weighing device may be various weighing equipment capable of weighing the mass of a mixture hopper or the mass of a raw material hopper, such as platform scale, steelyard and hanging scale.

The conveying mechanism may convey a material receiving unit between the outlets of different raw material units to achieve the objective that all the raw materials from different related raw material units enter the same material receiving container; in this case, material receiving container placement positions that can be identified by the control system are arranged on the conveying mechanism, such as including a transmission track or rotating plate, so that the material receiving unit can be conveyed to each related raw material unit to receive a preset amount of each related raw material according to the preset program through controlling the transmission track or rotating plate by the control system; alternatively, the material receiving container is fixed and different raw material units move, as shown in FIG. 4, in order to achieve the objective that all the raw materials supplied by different raw material units enter the material receiving container; or both the raw material units and the material receiving container move according to a certain rule, as long as the objective that all the raw materials supplied by different raw material units enter the material receiving container is achieved. As the raw material units are usually heavier than the material receiving container and may be in different sizes as well as in a large quantity, a preferred design scheme is to convey the material receiving container and the matched weighing unit.

The material mixing mechanism is a mechanism used to mixing the raw materials in the material receiving container, and the raw materials in the material receiving container may be used only after being mixed uniformly; liquid raw materials may become uniform naturally, and in case of powdery solid raw materials can be mixed uniformly with the help of an external force in a mechanical manner. The material mixing mechanism is a device for uniformly mixing the raw materials in the material mixing unit; it may be selected from a propeller agitator, a magnetic stirrer, a vibration mixer, an ultrasonic mixer and a flapping homogenizer.

A label unit is to print information of each material mixing process, and the printed information comes from a personalized nutritional scheme and matched with the contents of each mixture, including but not limited to personnel information, formula information, usage and dosage information, shelf life and other necessary information.

In the present invention, the control system, the raw material units, the conveying mechanism, the weighing device, the material mixing mechanism and the packaging mechanism are connected, and the connection includes electrical connection and connection through a mechanical structure. The electrical connection includes various signal lines and power lines, including but not limited to RS232, 485, USB, WIFI, Bluetooth and various signal transmission methods, as well as various voltage and circuit power connection methods conforming to the industrial standards. The mechanical structure includes, but is not limited to, slide rails, mechanical arms, hinges, gears, crankshafts, fasteners, racks, wheel sets, shafts and other common mechanical structures to achieve the fixation and movement of relative position of various module units.

In the present invention, the raw material unit, the conveying mechanism, the weighing device and the material mixing mechanism may be singular or plural.

The apparatus of the present invention may also be connected with one or more of a human body metabolism measurement instrument, a gene measurement instrument and a biological measurement instrument, wherein the energy intake of a personalized nutrition scheme may be determined based on the metabolism measurement instrument, and a nutrient demand and a microbial demand may be determined based on the gene measurement instrument and the biochemical measurement instrument; of course, other laboratory physical and chemical testing instruments may also be connected, such as chromatograph, spectrometer and mass spectrometer, and all are classified and considered as the biochemical measurement instrument.

The apparatus of the present invention may communicate with related modules through the network and may communicate with the cloud data center for data interaction and data storage, and the corresponding technology may adopt the technology commonly used in related fields. However, it is one of the characteristics of the present patent different from the existing equipment that in the apparatus of the prevent invention, personalized nutritional formulas can be downloaded through the cloud data center and nutrition products can be formulated according to the nutritional formulas.

According to the apparatus provided by the present invention, personalized formula products of different orders of magnitude (such as daily quantity for an individual, weekly quantity for an individual, monthly quantity for an individual, and customization of a certain scale) can be efficiently and accurately formulated according to the customer's personalized formula. The apparatus is used to provide personalized nutrition supply services on many occasions, such as but not limited to formula milk manufacturers, supermarkets, convenience stores and fitness centers. The design of the apparatus cannot only eliminate the mutual pollution between raw materials, but also ensure the accuracy of large amounts of components, especially trace components.

BRIEF DESCRIPTION OF THE DRAWINGS

The present invention is further explained below in combination with the drawings and the specific embodiments.

wherein a control system 1 controls a conveying mechanism 3 and feeding mechanisms 23.

Figure 2A:
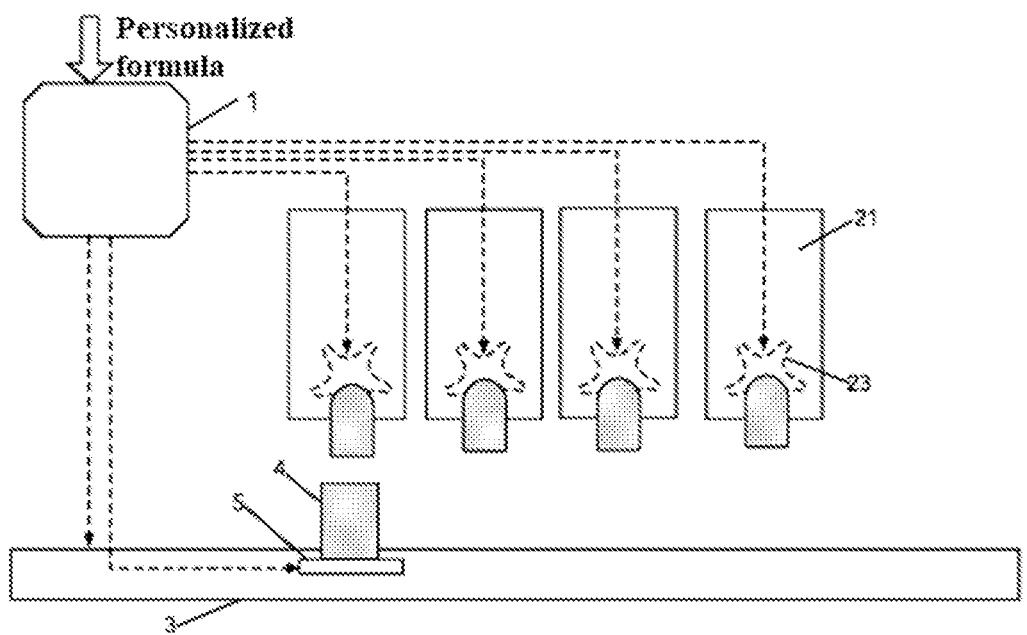
Figure 2B:
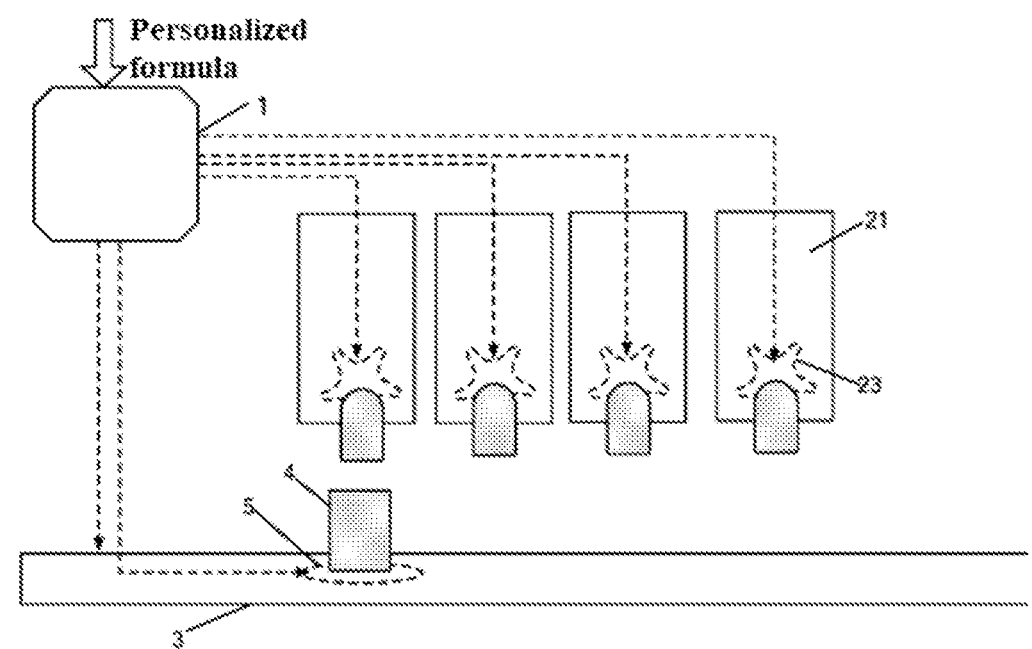

FIGS. 2A-2B schematically show representative embodiments of the apparatus for formulating a personalized formula product of the present invention;

wherein a material mixing mechanism 5 controlled by the control system 1 is arranged; in FIG. 2A, the material mixing mechanism 5 is a material mixing device independent of the conveying mechanism 3; in FIG. 2B, the material mixing mechanism 5 is embedded as a part of the conveying mechanism 3.

Figure 3A:
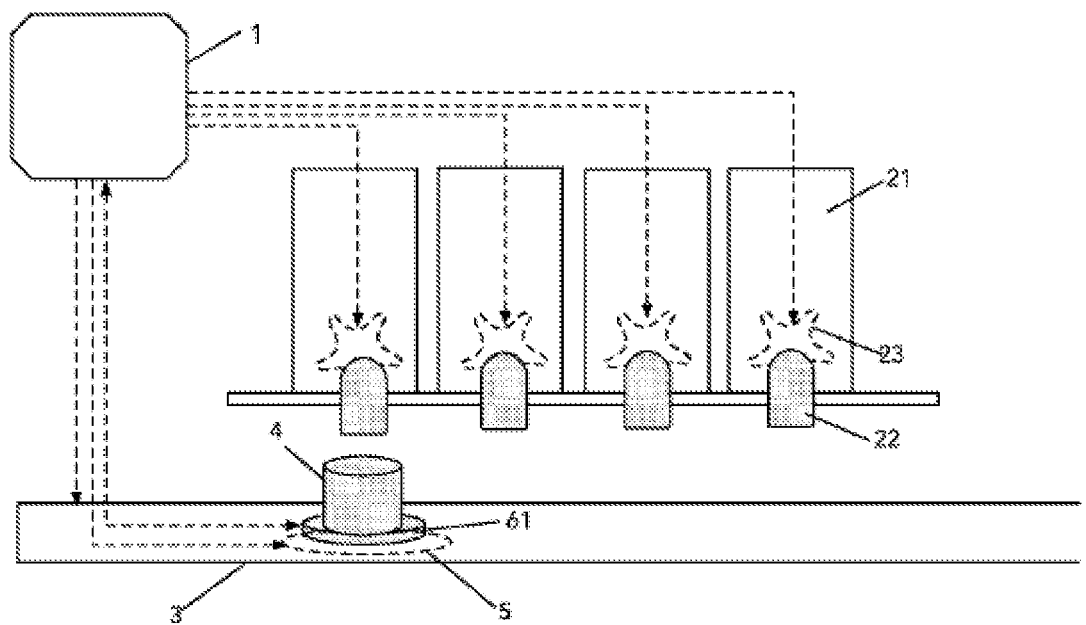
Figure 3B:
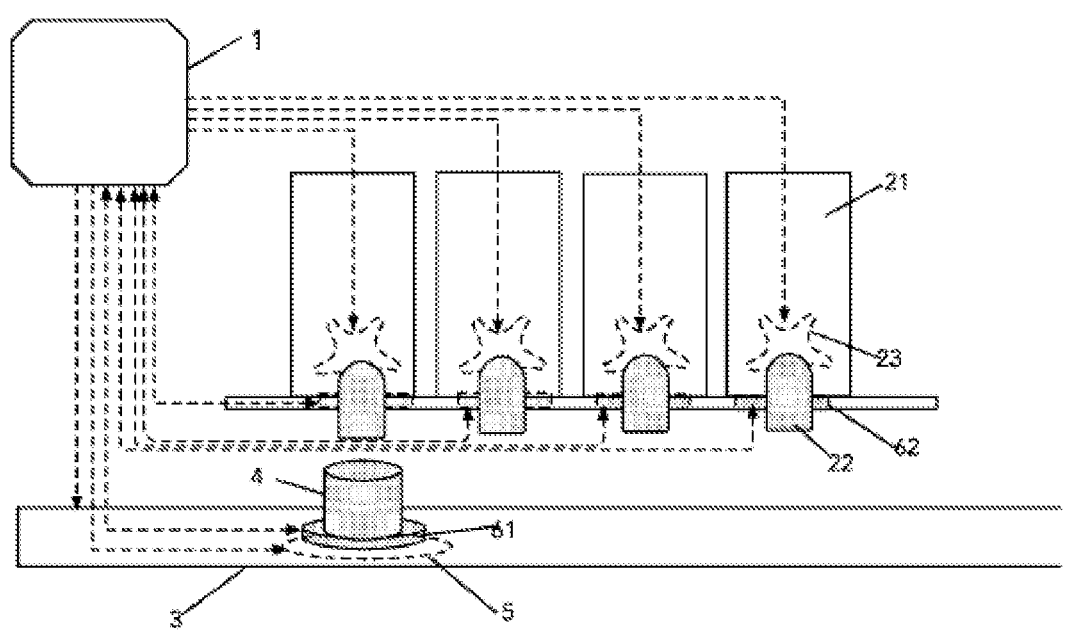

FIGS. 3A-3B schematically show representative embodiments of the apparatus for formulating a personalized formula product of the present invention;

wherein a weighing device(s) 61 and/or 62 controlled by the control system 1 is/are arranged;

in FIG. 3A, the weighing device 61 is configured to weigh a change in the weight of the raw material in a material receiving container, send the weighing data to the control system, and control when to stop each feeding mechanism 23 in a closed-loop way through the weight increased data of the raw materials in the material receiving container;

in FIG. 3B, the weighing device 62 is arranged at the bottom of the raw material unit, used to weigh a change in the weight of the raw material in each raw material unit 2; in this scheme, the weighing device 61 is also arranged at the bottom of the material receiving unit.

Figure 4:
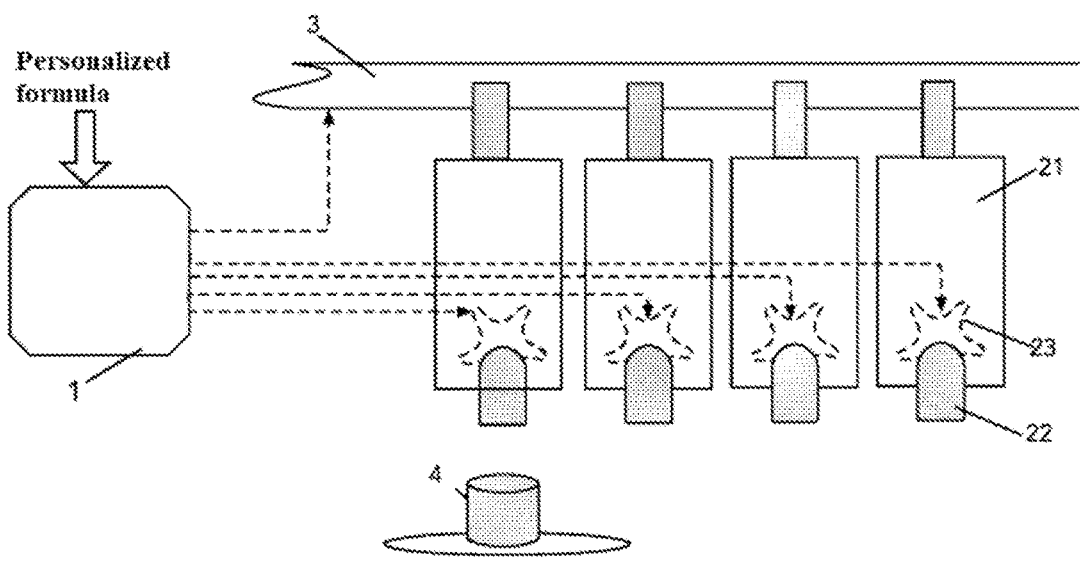

FIG. 4 schematically shows a representative embodiment of the apparatus for formulating a personalized formula product of the present invention;
  wherein the conveying mechanism conveys the raw material units 2 under the control of the control system 1, and the material receiving container 4 is fixed.

Figure 5:
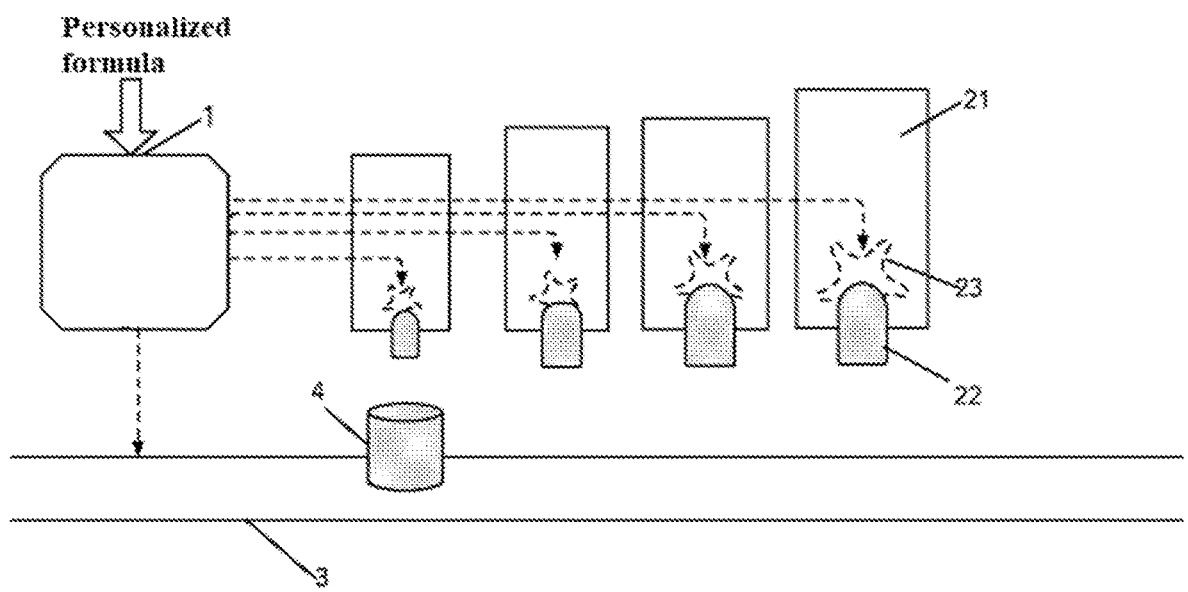

FIG. 5 schematically shows a representative embodiment of the apparatus for formulating a personalized formula product of the present invention;
  wherein the raw material units 2 are of different sizes, and the feeding mechanisms 23 are also of different sizes and specifications.

Figure 6:
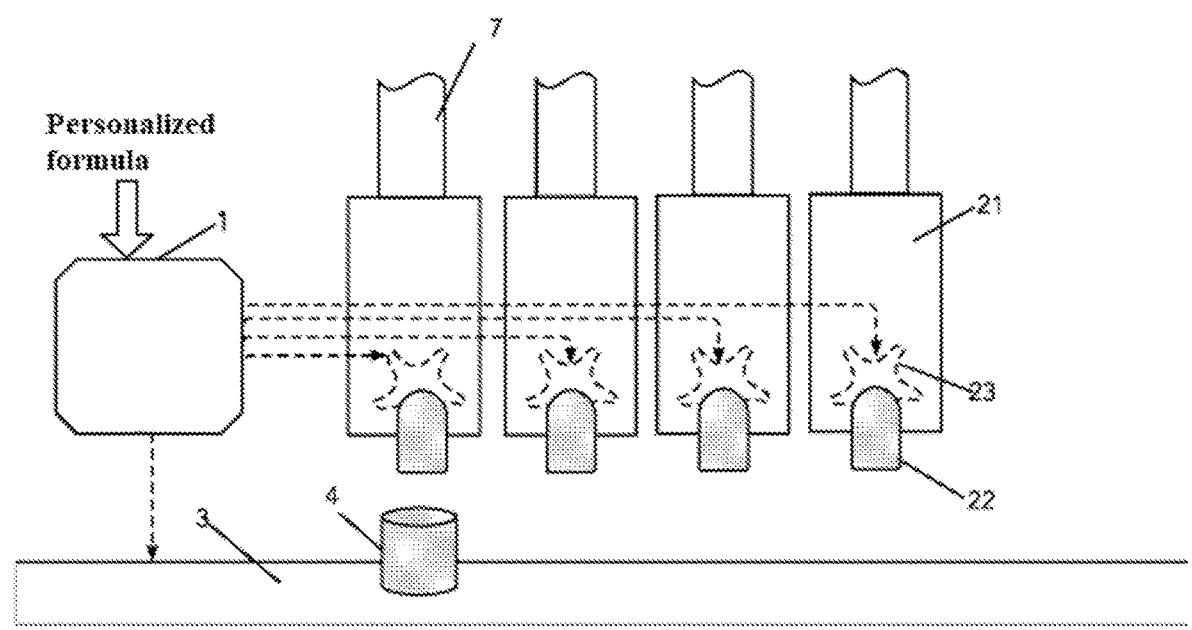

FIG. 6 schematically shows a representative embodiment of the apparatus for formulating a personalized formula product of the present invention, wherein each raw material unit 2 is connected with a raw material vessel of a greater capacity through a supplementing pipeline 7, so that raw materials can be supplemented in real time.

Figure 7:
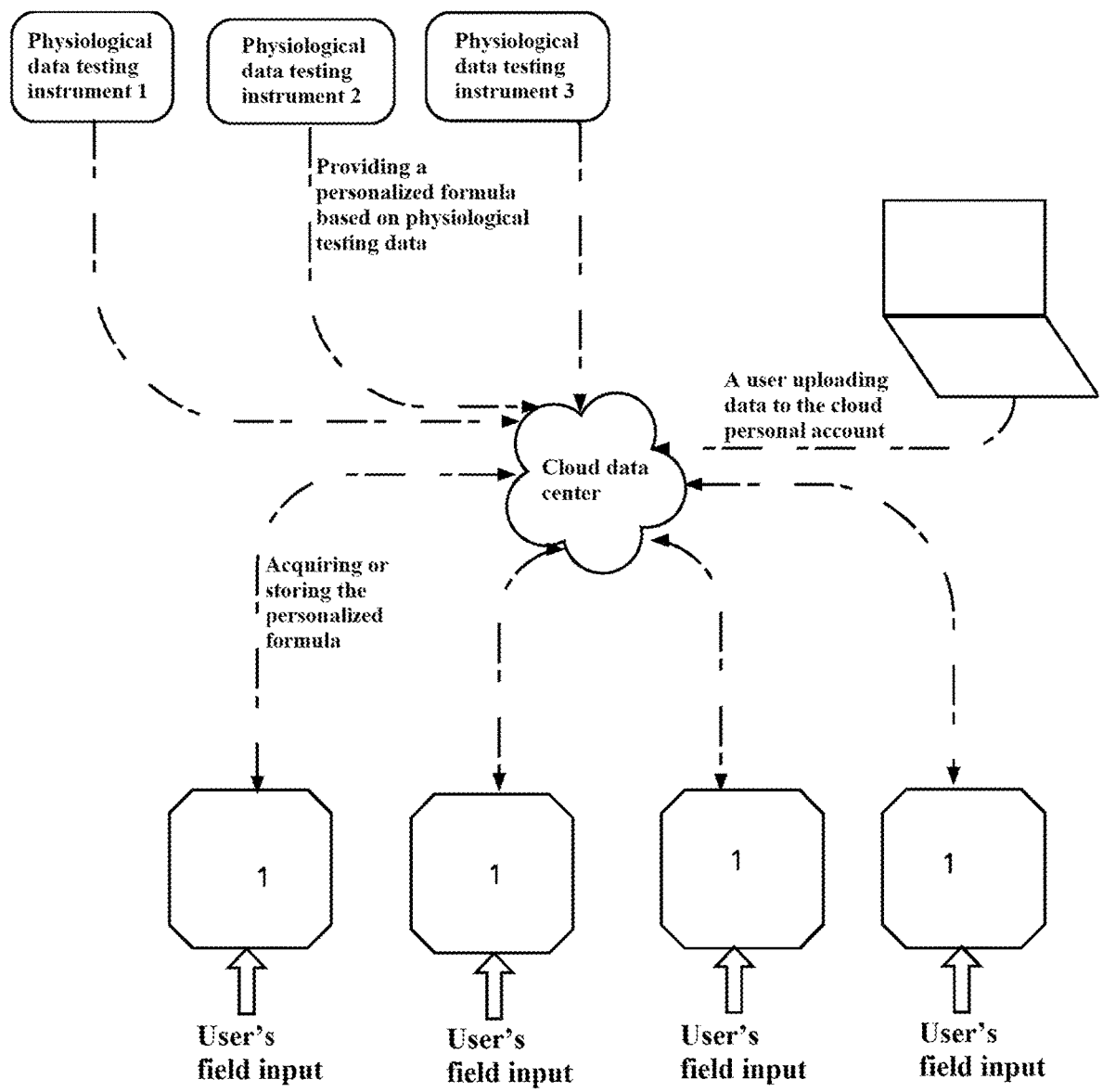

FIG. 7 schematically shows a system for formulating a personalized formula product based on the present invention, wherein the system connects the apparatus for formulating a personalized formula product of the present invention with a user and other physiological data testing instruments through the network;
  wherein the dotted line represents a network connection, and the arrow direction represents a direction of data transmission.

Figure 8:
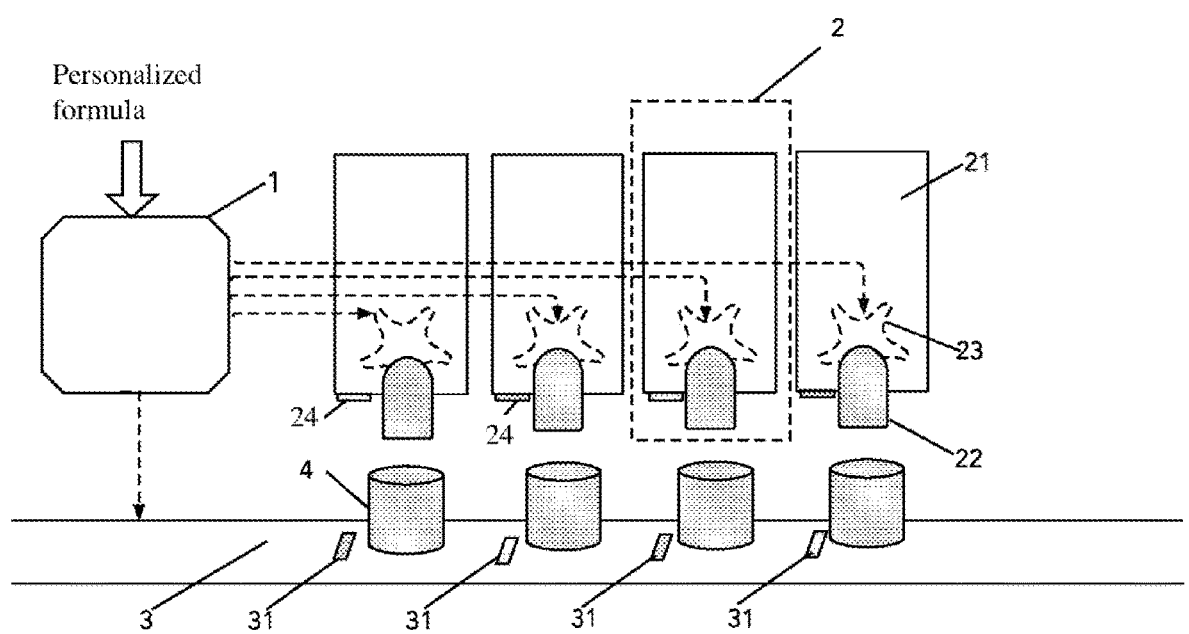

FIG. 8 schematically shows a representative embodiment of an apparatus for formulating a personalized formula product of the present invention;
  wherein in FIGS. 1-6, the dotted line with an arrow represents a relationship of signal transmission among various components in the system and the apparatus, 1—control system, 2—raw material unit, 21—raw material bin, 22—outlet, 23—feeding mechanism, 24—identification unit, 3—conveying mechanism, 31—location label, 4—material receiving container, 5—material mixing mechanism, 61, 62—weighing device, 7—supplementing pipeline.

DETAILED DESCRIPTION OF THE EMBODIMENTS

The present invention is explained below in combination with the drawings and the specific embodiments, but cannot be construed to limit the scope of the present invention.

Figure 1:
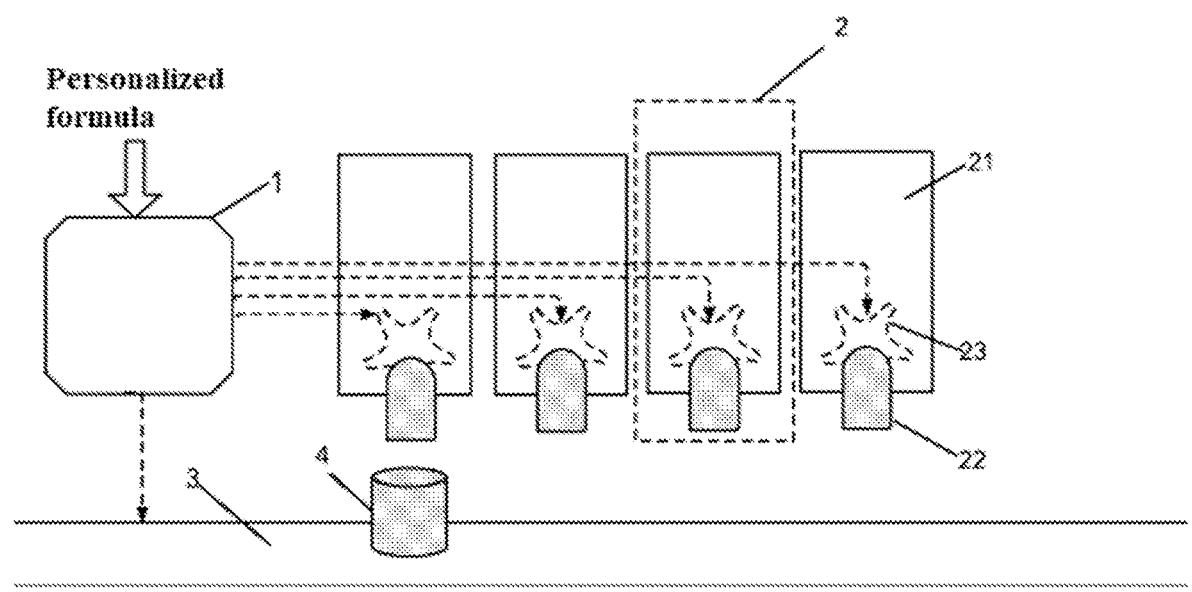
FIG. 1 schematically shows a representative structure of an apparatus for formulating a personalized formula product of the present invention.

As shown in FIG. 1, an apparatus for formulating a personalized formula product provided by the present invention includes a control system 1, a plurality of raw material units 2 and a conveying mechanism 3; wherein the plurality of raw material units 2 are used to hold different raw materials; each raw material unit 2 includes a raw material bin 21, an outlet 22 and a feeding mechanism 23; while in use, the plurality of raw material units 2 are arranged in a manner that the raw material units can be identified by the control system; the feeding mechanism 23 is used to transfer the raw material from the raw material bin 21 to the outlet 22 and then into a material receiving container 4 under the control of the control system 1; each of the raw material units 2 is configured with the respectively independent outlet 22, that is, the outlets 22 of the raw material units 2 are separated from each other; the conveying mechanism 3 is used to convey the material receiving container 4 or the plurality of raw material units 2 and configured to be controlled by the control system 1, and enables the material receiving container 4 to relatively move to the position of the outlet 22 of any of the raw material units 2; and the control system 1 is used to generate a preset program based on a personalized formula product and control the conveying mechanism 3 and the feeding mechanisms 22 in the raw material units 2 related to the preset program according to the preset program; the control includes enabling the material receiving container to relatively move to the outlet of one of the related raw material units, and enabling the feeding mechanism of the related raw material unit to supply a required amount of raw material to the material receiving container; then enabling the material receiving container to relatively move to the outlet of another raw material unit related to the preset program, and enabling the feeding mechanism of the another related raw material unit to supply a required amount of raw material to the material receiving container; and keeping on the operation until the preset program is completed.

In some embodiments, as shown in FIG. 8, each of the raw material units further includes an identification unit 24;
  the conveying mechanism is of a crawling transmission structure, a plurality of material receiving container placement positions are arranged on the conveying mechanism, and each of the material receiving container placement positions has a unique location label 31 to be identified by the identification unit; the conveying mechanism is used to, under the control of the control system, enable the material receiving container in the material receiving container placement position to move to the outlet of a raw material unit, and continue to move to the outlet of the next raw material unit after the material receiving container receives the material;
  the control system is used to:
  designate a material receiving container placement position for each personalized formula, and extract a location label thereof; generate a corresponding preset program based on each personalized formula;
  the preset program contains information of related raw material units, preset feeding amount information of each related raw material unit, and labels of the material receiving container placement positions;
  according to the preset program, control the conveying mechanism to enable the material receiving container in the designated material receiving container placement position to advance and pass through each raw material unit, and identify the related raw material unit through the identification unit; and control the feeding mechanism in the related raw material unit to supply a preset feeding amount of raw materials to the material receiving container when the material receiving container meets the related raw material unit.

In some embodiments, the control system is a module used to coordinate the collaborative operation of all parts of the whole apparatus, including but not limited to, a microprocessor and various electronic and electrical components. Or an industrial embedded computer or industrial personal computer is adopted, and corresponding software programs can be run to complete the required operation. The control system includes a calculating module, a control module and a signal processing module; wherein
  the calculating module is used to calculate the corresponding raw material units, related raw material units, conveying routes of the conveying mechanism, as well as the start/stop time, operating time and/or operating speed of the feeding mechanisms in each related raw material unit according to the personalized formula; thus the preset program is obtained; the control module controls the conveying mechanism and the feeding mechanisms of the related raw material units according to the preset program; in some schemes, the signal processing module is used to process the feedback information during the operation of the apparatus, and adjust the control module according to the feedback information. In the following scheme using the closed-loop control of weighing data, the signal processing module processes the real-time weighing data from the weighing device and adjusts the control module.

In the apparatus of the present invention, a load-bearing range of the plurality of raw material units may be different; in different application scenarios, the load-bearing range of each raw material unit for solid raw materials is independently selected from less than 20,000 kg, less than 10,000 kg, less than 5,000 kg, less than 1,000 kg, less than 100 kg, less than 80 kg, less than 60 kg, less than 40 kg, less than 20 kg, less than 10 kg or less than 5 kg;

the load-bearing range of each raw material unit for liquid raw materials is independently selected from "less than 100,000 L, less than 50,000 L, less than 20,000 L, less than 10,000 L, less than 7,000 L, less than 5,000 L, less than 500 L, less than 1,000 L, less than 500 L, less than 300 L, less than 150 L, less than 100 L, less than 70 L, less than 50 L, less than 30 L, less than 20 L, less than 10 L or less than 5 L".

Or a capacity range of each raw material unit is 10-10,000 times of a daily recommended amount of the corresponding raw material, and preferably 10-3,000 times.

In some embodiments, a conveying range of the conveying mechanism is configured such that it is allowed to increase or decrease the number of raw material unit. In this way, the apparatus of the present invention can be applicable to the personalized formulation of a formula product containing as few as two or three raw materials, or the personalized formulation of a formula product containing as many as dozens of raw materials, such as formula milk powder.

Material Mixing Mechanism, Packaging Mechanism

In some embodiments, based on any of the above-mentioned embodiments, a material mixing mechanism 5 is also arranged, wherein the material mixing mechanism 5 is configured to mix the raw materials received by the material receiving container 4 according to the preset program under the control of the control system 1. Examples are as shown in FIG. 2A-FIG. 3B. The material mixing mechanism may be selected from a propeller agitator, a magnetic stirrer, a vibration mixer, an ultrasonic mixer and a flapping homogenizer.

In an optional embodiment, the material mixing mechanism 5 is arranged in the path of conveying the material receiving container. For example, the material mixing mechanism may be either independent of the conveying structure or arranged on the conveying structure, used to mix the raw materials in the material receiving container in the process of receiving and conveying or mix the raw materials in the material receiving container after all related raw materials are received. In such scheme, under the control of the control system, when the material receiving container that has received one or more related raw materials passes through the position of the material mixing mechanism, the material mixing mechanism is started to perform the uniform mixing operation for the material receiving container.

The uniform mixing operation can achieve the scheme of, but not limited to, enabling the material receiving container to stay for a preset time by controlling the conveying mechanism, material receiving container to complete the uniform mixing or during receiving the raw materials without suspending the conveying.

In combination with the previous optional embodiment, preferably, the material mixing mechanism 5 is configured as a part of the conveying mechanism 3, and more preferably, the material mixing mechanism 5 is arranged in the material receiving container 4 placement position on the conveying mechanism 3; a material mixing mechanism 5 is arranged in each of the material receiving container placement positions to mix the raw materials in the material receiving container during or after material receiving. For example, a contactless uniform mixing mechanism may be adopted, including but not limited to a magnetic stirrer, a vibration mixer, an ultrasonic mixer and a flapping homogenizer. According to an example as shown in FIG. 2B, the material mixing mechanism is configured as a part of the conveying mechanism, and can be embedded in each of the material receiving container placement positions of the conveying mechanism in some embodiments.

In another optional embodiment, the material mixing mechanism 5 has a material receiving container load-bearing structure, used to accommodate the material receiving container 4; or the material mixing mechanism is configured to include the material receiving container. In the embodiment, the material mixing mechanism itself has the structure and functions of the material receiving container, and can uniformly mix the received raw materials.

The material mixing mechanism is conveyed by the conveying mechanism together with the material receiving container.

In combination with any of the above-mentioned optional embodiments, optionally, the material mixing mechanism 5 is configured to mix the raw materials in the material receiving container in a contactless manner. For example, the magnetic stirrer, the vibration mixer, the ultrasonic mixer and the flapping homogenizer apply an external force such as vibration, shaking or rotation to realize uniform mixing; or optionally, the material mixing mechanism is configured to uniformly stir the raw materials in the material receiving container, for example, a propeller agitator goes deep into the raw material for stirring and mixing uniformly.

In combination with any of the above-mentioned optional embodiments, the material mixing mechanism further includes a packaging unit, used to package the material receiving container after receiving all the related raw materials.

An embodiment for a weighing device to achieve closed-loop control In a group of embodiments of the present invention, based on any of the above-mentioned embodiments, the device further includes weighing devices 61, 62, used to measure a change in the weight of a related raw material, and configured to send weighing data to the control system in real time; the control system controls the feeding mechanism in the corresponding related raw material unit based on the weighing data of the related raw material. An example is as shown in FIGS. 3A-3B.

The weighing devices in the present invention may be various weighing equipment, such as platform scale, steelyard and hanging scale, as well as weighing sensor chip.

In a group of optional embodiments, the weighing data refer to changes in the weight of raw materials in the material receiving container;

the weighing device 61 is configured to begin to weigh the weight increase data of the related raw material in the material receiving container when the material receiving container relatively moves to the position of the outlet of the related raw material unit, and send the data to the control system 1 in real time; when a difference between the weight increase data and a required quantity value of the related raw material reaches an error within an allowable range, the control system closes the feeding mechanism in the current related raw material unit and relatively move and convey the material receiving container to the outlet of the next related raw material unit. An example is as shown in FIG. 3A.

In combination with the previous optional embodiment, a preferred scheme is as follows: in the apparatus, the plurality of raw material units are arranged in fixed positions, the conveying mechanism is used to convey the material receiving container to the outlets of various related raw material units under the control of the control system; the weighing device as a part of the conveying mechanism is arranged in the placement position of the material receiving container. An example is as shown in FIGS. 3A-3B.

In combination with the previous optional embodiment, another preferred embodiment is as follows: the weighing device is independent of a conveying device. When the apparatus is operating, the material receiving container may be put on the apparatus, wherein the weighing device may be either an independent electronic scale, or arranged at the bottom of the material receiving container as a part of the material receiving container; no matter which scheme is adopted, the weighing device is configured to be controlled by the control system, and the weighing device can reset the previous data before receiving a new related raw material, then start to weigh a new change in weight, and send the weighing data to the control system.

In another group of optional embodiments, the weighing data refer to a change in the weight of raw materials in the raw material units;

the weighing device is used to weigh the weight decrease data of the related raw material in the related raw material unit when the material receiving container relatively moves to the position of the outlet of the related raw material unit, and send the data to the control system in real time; when a difference between the weight decrease data of the related raw material and a required quantity value of the related raw material reaches an error within an allowable range, the feeding mechanism is closed, and the material receiving container is relatively moved and conveyed to the outlet of the next related raw material unit. An example is as shown in FIG. 3B.

In combination with the previous optional embodiment, another preferred scheme is as follows: the weighing device is configured to be associated with the raw material units. For example, one of the weighing devices may be arranged in the bottom position of each raw material unit, or the plurality of raw material units may share one weighing device. No matter which scheme is adopted, the weighing device is configured to be controlled by the control system, and the weighing device can reset the previous data before the feeding mechanism of a new related raw material unit is started, then start to weigh a new change in weight, and send the weighing data to the control system.

In combination with any of the above-mentioned closed-loop control embodiments, preferably, the weighing accuracy of the adopted weighing device reaches 1/1,000, 1/10,000, 1/100,000 or 1/1,000,000.

All the above schemes may achieve the objective of high-precision mixing by sending to the control system the change in the weight detected by the weighing device to control the feeding mechanism, namely achieving the closed-loop control. The feeding mechanism may be driven by a stepping motor, a servo motor or various motors with code feedback control, so as to achieve better and convenient control.

Scheme of Controlling the Feeding Amount by the Operating Quantity, Operating Time or Operating Speed of the Motor and the Feeding Mechanism The present invention may also be independent of the closed-loop control under the control of the weighing device. The required feeding amount is achieved by controlling the operating quantity (such as the number of rotations, rotating angle) or operating speed of the feeding mechanism 23 through the preset program, and this manner allows the apparatus to formulate a plurality of formula products at the same time. The details are described as follows:

based on the embodiment of any of the above-mentioned apparatuses, for the raw material unit used for solid raw materials, the feeding mechanism includes a feeder and a driving device thereof; and for the raw material unit used for liquid raw materials, the feeding mechanism is selected from, but is not limited to a metering pump, a peristaltic pump, a diaphragm pump and a rotary vane pump.

In an optional embodiment, preferably, in the apparatus, at least two, three, four, five or all feeding mechanisms in the plurality of raw material units have different feeding accuracy.

The raw materials required for a type of formula food usually include a large number of nutrients, such as carbohydrate and protein, as well as micronutrients, such as vitamins and minerals, with proportions in the formula varying by a thousand or even ten thousand times. Therefore, the raw material units holding different raw materials adopt feeding mechanisms with different feeding accuracy; as shown in FIG. 5, different raw material units are of different sizes according to the usage amounts (large amount, moderate amount or small amount) of contained raw materials, and especially the specification of the feeding mechanisms 23 of these raw material units are required to meet the feeding accuracy requirement.

In combination with the previous optional embodiment, preferably, the feeding mechanism 23 of each of the raw material units is independently configured to have a feeding accuracy of 0.01-1 g, and preferably 0.1 g or 1 g.

In an optional embodiment, preferably, the feeding mechanism is a screw feeder;

a thread pitch of the screw feeder of each of the raw material units is independently selected from values from 0.1 mm to 100 mm, and preferably values from 1 mm to 50 mm.

In an optional embodiment, preferably, the feeding mechanism is a screw feeder;

a screw diameter of the screw feeder of each of the raw material units is independently selected from values from 0.1 mm to 100 mm, and preferably values from 1 mm to 50 mm.

In order to reach the above-mentioned feeding accuracy, those skilled in the art may select a satisfactory screw feeder from the existing products.

Based on the above-mentioned optional embodiment, preferably, the driving device is a motor. For example, the driving device is, but is not limited to, a stepping motor or a servo motor that can control the rotating time, rotating speed or rotating angle.

Extending Schemes

In some implementation scenarios, the above-mentioned apparatus further includes primary raw material tanks connected with the raw material units, and raw materials are supplemented in batches to each of the raw material units from the primary raw material tanks. Preferably, the primary raw material tank is connected with the raw material unit through a supplementing pipeline 7. An example is as shown in FIG. 6.

In some implementation scenarios, the apparatus can interact information with a cloud data control center through a network to acquire and store personal data authorized by customers, as well as personalized formula recommended according to the personal data;
  the personal data include, but are not limited to, body height, body weight, blood type, genes, age, allergen, taste preference and specific physiological test data;
  the personalized formula includes, but is not limited to, formula for infant milk powder, formula for infant complementary food, formula for dietary additives, and formula for beverages;

In some application environments directly oriented to personal users, any of the above-mentioned apparatuses may further include a printing unit, used to print information related to the formulated product for customers.

The present invention further provides a system for formulating a personalized formula product, wherein
  the system includes at least one set of the apparatuses in any of the above-mentioned embodiments connected to interact information with a cloud data center through a network; preferably, the system is configured to:
  allow a customer to create an account in the system, upload the formula of a personalized formula product or upload the personal information for generating the formula of the personalized formula product, and store the information of all previous personalized formula products (including but not limited to: formula, date of formulation, formulation quantity of corresponding physiological data, and video information of formulation process);
  and allow the customer or a service provider authorized by the customer to acquire the formula based on the personalized formula product from the at least one set of the apparatuses included in the system and generate the preset program to control the device, so as to formulate the personalized formula product of the customer. An example is as shown in FIG. 7.

Preferably, the system further includes one or more of a metabolism measurement instrument, a gene testing instrument and a biochemical measurement instrument, wherein these instruments are connected with the system through the network to store and send the testing data of the customer according to a customer instruction, and generate a personalized formula for the customer. An example is as shown in FIG. 7.

The gene testing instrument may be either a measurement device for gene sites and segments, or a sequencing device, including but not limited to PCR, a gene sequencing instrument and mass spectrum. Personalized gene information is adopted to assist to confirm a nutritional formula, such as fat, protein and vitamins, as well as the personalized quantity of various trace elements.

The biochemical measurement instrument determines the demand status of a human body for nutrients by using generalized biochemical analytical indicators, including but not limited to biochemical and immunological methods, so as to complete a personalized nutritional formula.

The above measurement instruments may be either directly connected with the system through various industrial communication protocols, or connected with the system through various protocols of the Internet and the Internet of Things or a cloud storage data center medium. The protocol types include, but are not limited to, WIFI, RS232 and related protocol family, TCP, UDP, IP protocol family and Bluetooth.

Usage of the Apparatus

A method for formulating a personalized formula product, wherein the apparatus in any of the above-mentioned embodiments is provided with:
  (1) a personalized formula;
  (2) a preset program generated based on the personalized formula;
  (3) a material receiving container; the apparatus is started, the control system controls the conveying mechanism and the feeding mechanism in the raw material unit related to the preset program according to the preset program, enables the material receiving container to relatively move to the outlet of one of the related raw material units, and enables the feeding mechanism of the related raw material unit to supply a required amount of raw material to the material receiving container; then enables the material receiving container to relatively move to the outlet of one of the related raw material units of the preset program, and enables the feeding mechanism of the another related raw material unit to send required amount of raw materials to the material receiving container; and keeps on the operation until the preset program is completed.

In a preferred embodiment, the preset program includes an operating quantity or operating speed of the feeding mechanism set based on the required amount of the related raw material in the personalized formula.

In a scheme that the feeder is a screw feeder, the operating quantity refers to a number of rotations of the screw feeder, and the operating speed refers to a rotating speed of the screw feeder.

In combination with the previous preferred embodiment, preferably, the control system enables the material receiving container to stay at the outlet of each raw material unit for the same period of time, and controls to start the feeding mechanism in the related raw material unit to operate at the preset operating quantity or operating speed, so as to achieve the required feeding amount of each related raw material.

In combination with the previous preferred embodiment, preferably, a plurality of personalized formulas are provided to the apparatus, and the apparatus generate a plurality of preset programs based on the plurality of personalized formulas; a corresponding material receiving container is provided for each personalized formula;
  the plurality of material receiving containers were simultaneously arranged on the conveying mechanism in sequence, and the apparatus is started;
  the conveying mechanism simultaneously conveys the plurality of material receiving containers, and the plurality of material receiving containers stay at the outlets of various raw material for the same period of time, and then continues to advance;
  when the material receiving container corresponding to one preset program advances to the outlet of the related raw material unit, the control system control to start the feeding mechanism to operate at the preset operating quantity or operating speed, so as to achieve the required feeding amount of the related raw material; and when the material receiving container advances to the outlet of an unrelated raw material unit, the feeding mechanism will not be started.

In an optional embodiment, the method further includes acquiring the personalized formula of authorized by a customer or provided by a customer, and generating the personalized control program for controlling the apparatus based on the personalized formula.

In an optional embodiment, the method includes the system including at least one set of the apparatuses connected to interact information with a cloud data center through a network;

a data storage space is provided in the apparatus to:

allow a customer to create an account, upload a personalized formula or upload the personal information for generating a personalized nutritional formula, and store the information of all previous personalized nutritional formula products (including but not limited to: personalized formula, date of formulation, formulation quantity, and video information of formulation process);

and allow the customer or a servicer authorized by the customer to acquire the personalized nutritional formula from the at least one set of the apparatuses included in the system and generate the personalized control program to control the device, so as to formulate the personalized nutritional formula product of the customer.

the related raw material contained in a part of the raw material units is one raw material or a mixture of multiple raw materials.

For example, trace element raw materials and main nutritional raw materials are mixed; owing to an extremely low daily demand for the trace elements, it is very difficult to reach the accuracy for single feeding, and proportional accurate feeding of trace element raw materials and main nutritional raw materials can be achieved after the trace element raw materials are mixed with the main nutritional raw materials in proportion.

Example 1

As shown in FIG. 3A, a control system generates a preset program after receiving a customer's personalized formula data; and the control system 1 controls a conveying mechanism 3 and each feeding mechanism 23 according to the preset program.

Wherein the feeding mechanism 23 includes a screw feeder and a stepping motor, the stepping motor accurately rotates for a preset angle according to a control instruction of the control system 1, so that the screw feeder can send a fixed quantity of material powder into a material receiving container 4, wherein both the diameter and thread pitch of the screw feeder may be regulated according to the actual condition; at present, the feeding amount that can be achieved in industry can range from tens of micrograms to tens of kilograms to meet the requirements of the present invention.

The material receiving container 4 can adopt a conventional hopper, a wide mouthed bottle with screws and a diameter of 8 cm is preferably adopted in this example, and 500 g-5 kg may be contained in one time. The material receiving container 4 is arranged on a weighing device 61, wherein the weighing device 61 is a platform scale with a range of 0-5,000 g and an accuracy of 0.1 g or 0.01 g.

The weighing device 61 is installed on the conveying mechanism 3, and the conveying mechanism 3 in this example is a conveyor belt. The conveying mechanism 3 can further include guide rails and an object stage (such as wheel-driven trolley type) capable of moving on the guide rails, and the weighing device 61 (platform scale) is arranged on the object stage. The conveying mechanism 3 conveys the material receiving container 4 to move among different outlets to receive material power in the different related raw material units 2 until all the raw materials involved in the preset program are received.

The raw materials mixed in the material receiving container 4 can be stirred, uniformly mixed and packaged by the material mixing mechanism. In this example, a magnetic stir is used for the uniform mixing. In this example, the material receiving container 4 is a disposable wide mouthed bottle which may be used as the package for final sales, so as to reduce the sub-packaging steps and better avoid pollution. In some embodiments, subsequent processing may further be carried out, such as drying and sterilization.

The material receiving container 4 may also be a reusable vessel, and the raw materials mixed in the material receiving container 4 are then canned in another vessel.

The steps for formulating a personalized formula product are illustrated as follows:

1. The control system generates a preset program after receiving a customer's personalized formula data, and the related raw material units are No. 1, 2, 3, 6 and 8 raw material units; the preset program includes the parameters such as the start time for starting the respective feeding mechanisms in the No. 1, 2, 3, 6 and 8 raw material units, the number of rotations of a screw rotator in each of the feeding mechanisms, and the start position of the material receiving container 4 on the conveying mechanism.
2. The material receiving container 4 is arranged on a platform scale on an object stage.
3. The control system 1 controls the object stage carrying the platform scale and the material receiving container 4 to move to the outlet 22 of the No. 1 raw material unit 2;
4. The control system 1 controls the screw feeder of the feeding mechanism 23 of the raw material unit 2 to rotate; in the process of feeding, when the rotating angle is close to a preset value, the screw feeder is stopped under closed-loop control according to the weight of the raw material falling into the material receiving container 4 measured by the weighing device 61, so as to accurately control the present weight of the received raw material. Finally, the value returned by the weighting device 61 of the system is used to determine the weight of the materials actually supplied into the material receiving container 4, rather than determining the amount of the materials falling into the material receiving container 4 by open-loop control based on the number of rotations of the screw rotator. When the actual value and the preset value reaches a value within a certain range, it is considered as qualified. This method can accurately determine the amount of various materials in the final formula product.
5. The object stage carrying the material receiving container 4 moves to the outlet of the next raw material unit 2;
6. Steps 4-5 are repeated until the material receiving container 4 has received a preset amount of the raw materials from all the No. 1, 2, 3, 6 and 8 raw material units.
7. After completing the above steps, the steps of stirring, uniform mixing, label printing and packaging may be performed according to the situation.

The accurate proportioning of various components may be achieved through the above steps to meet the needs of personalized nutrition.

a carrying capacity range of the material receiving container 4 is 0-100 kg, and a preferred range is 0-20 kg; an optional volume range of the material mixing units is 0-150 L, and a preferred volume range is 0-30 L; a weighing range of the weighing unit is 0-100 kg, a preferred weighing range is 0-20 kg; and a weighing accuracy range of the weighing unit is 10 g-0.0001 g, and a preferred weighing accuracy range is 0.1 g-0.01 g; an optional range of feeding accuracy of the feeding unit is 0.001-100 g for liquid and solid, and a preferred range of feeding accuracy is 0.1 g-10 g; a screw diameter range of the screw feeder is 0.1 mm-100 mm, a preferred screw diameter range is 10 mm-50 mm, a thread pitch range of screws is 0.1 mm-100 mm, and screws with variable pitch and variable diameter can be used;

liquid may be conveyed by using various liquid pumps as long as demands are satisfied.

A range for selecting the capacity of the raw material units is 10-10,000 times the standard recommended daily average intake of the corresponding content for man, and a preferred capacity range is 10-3,000 times; a range for selecting the feeding accuracy of the feeding mechanism is 0.0001-10 times the daily average human intake recommended by the standard recommended daily average intake of the delivered material for man, and a preferred range of feeding accuracy is 0.001-10 times, a capacity range of the material receiving container 4 is 0.1-200 times the recommended daily consumption of the final product, and a preferred capacity range is 5-30 times.

The following equipment parameters have also been adopted in this embodiment:

| Component Raw Material Unit | Parameter Name | Number of Parameters | | | |
| --- | --- | --- | --- | --- | --- |
| | | 10 times the daily average intake for man | 1,000 times the daily average intake for man | 1,000 times the daily average intake for man | 10,000 times the daily average intake for man |
| Feeding Mechanism | Feeding Accuracy | 0.001 g | 1 g | 10 g | 100 g |
| Material Receiving Container | Volume | 0.01 L | 30 L | 5 L | 150 L |
| Material Receiving Container | Load-bearing Weight | 1 g | 20 kg | 5 kg | 100 kg |
| Weighing Device | Weighing Range | 1 g | 20 kg | 5 kg | 100 kg |
| Weighing Device | Weighing Accuracy | 0.0001 g | 0.01 g | 0.1 g | 10 g |

In this embodiment, the material receiving container 4 is a wide mouthed bottle, and the advantage in this way is that the material receiving container may be directly used as a commodity package. The specific implementation method is that when the wide mouthed bottle used as the material receiving container contains all the preset components in proportion, the various components are not evenly mixed at this time, and a mixing mechanism (propeller agitator) is inserted into the material mixing unit 301 for full stirring to ensure that the various components are uniformly mixed. In order to prevent the powder from splashing out during the stirring, the bottle mouth can be blocked with a corresponding structure. On completion of stirring, propeller agitator is removed and cleaned, the bottle mouth is sealed, and then the wide mouthed bottle may be sold as an independent product. A specific labels can be printed and pasted according to the actual amount of powder in the material receiving container, and may further include customer information, usage and other related information.

If a large package is not easy to use, a common sub-packaging instrument may also be used for sub-packaging into small packages convenient for use. The required equipment may be a common sub-packaging instrument for food.

In this example, the agitator and the stirring method may be selected from a propeller agitator, a magnetic rod agitator, a magnetic stirrer, a vibration agitator and a tumbling agitator. In this example, the propeller agitator is preferred; the stirring method adopts high-speed stirring by direct deep insertion, so as to achieve the objective of fast and uniform mixing of solid powder. In case of liquid, tumbling stirring can be adopted to avoid cross contamination.

The propeller agitator may adopt a disposable product, and the material receiving container may adopt a marketable vessel, in order to prevent cross contamination and realize the technical solution of convenient, rapid, low-cost and accurate formulation of personalized nutrition at the same time.

Example 2

This example is a relatively complicate scheme based on example 1, and the differences from example 1 include the followings:

first the raw material units are weighed, as shown in FIG. 3B, so that more data can be obtained compared with the scheme of weighing the material receiving container alone. For example, the weight of the material powder entering the material receiving container should be equal to the weight reduction of the corresponding raw material unit. The control system may make various logical judgments according to the difference between the two values, such as whether the material powder completely falls into the material mixing unit, or avoiding the failure of a weighing device and a weighing error of the system.

In addition, in this example, the related raw material units 2 and the feeding mechanisms 23 are also moved simultaneously or separately; as shown in FIG. 4, The raw material units and the feeding units may be moved by placing on the object stage or wheeled vehicle running on the guide rails, and the rotating mechanical structure is also an optional scheme.

Example 3

This example is a system for evaluating an additive nutritional solution based on example 2, wherein a metabolism measurement device is added; the metabolism measurement device may be either a metabolism measurement device using direct calorimetry, a metabolism measurement device using indirect calorimetry, or a formula-based metabolism calculation device. In this example, the metabolism measurement device using indirect calorimetry is preferred to calculate a personalized daily energy intake, as shown in FIG. 7.

Those skilled in the art should be familiar with that the above-mentioned embodiments are only intended to explain the objective of the present invention, rather than limiting the present invention and any change and modification to the above-mentioned embodiments within the substantial protection scope of the present invention will fall into the scope of the claims of the present invention.

The invention claimed is:

1. An apparatus for formulating a personalized formula product, comprising a control system, raw material units and a conveying mechanism; wherein
the raw material units are used to hold different raw materials; each of the raw material units comprises a raw material bin, an outlet and a feeding mechanism; while in use, the raw material units are arranged in a manner allowing the raw material units to be identified by the control system;
the feeding mechanism is used to transfer the different raw materials from the raw material bin to the outlet and then into a material receiving container under a control of the control system;
each of the raw material units is configured with a respectively independent outlet, wherein the respectively independent outlets of the raw material units are separated from each other;
the conveying mechanism is configured to convey the material receiving container or the raw material units, the conveying mechanism is controlled by the control system, and under the control of the control system, the conveying mechanism enables the material receiving container to relatively move to a position of the outlet of one of the raw material units;
the control system is configured to
generate a preset program based on the personalized formula product, and
control the conveying mechanism and the feeding mechanisms in the raw material units related to the preset program according to the preset program;
the control of the control system comprises
enabling the material receiving container to relatively move to an outlet of a first raw material unit related to the preset program,
enabling the feeding mechanism of the first raw material unit to supply a required amount of first raw material to the material receiving container;
enabling the material receiving container to relatively move to an outlet of a second raw material unit related to the preset program,
enabling the feeding mechanism of the second raw material unit to supply a required amount of second raw material to the material receiving container; and
keeping on the operation until the preset program is completed.

2. The apparatus according to claim 1, wherein
each of the raw material units further comprises an identification unit;
the conveying mechanism is of a crawling transmission structure, material receiving container placement positions are arranged on the conveying mechanism, and each of the material receiving container placement positions has a unique location label to be identified by the identification unit;
the conveying mechanism is configured to, under the control of the control system, enable the material receiving container in the material receiving container placement position to move to the outlet of one raw material unit, and further move to the outlet of a next raw material unit after the material receiving container receives the raw material;
the control system is configured to:
designate a material receiving container placement position for each personalized formula,
extract a location label of the material receiving container placement position,
generate a corresponding preset program based on each personalized formula, wherein the corresponding preset program contains information of related raw material units, preset feeding amount information of each related raw material unit, and labels of the material receiving container placement positions,
according to the corresponding preset program, control the conveying mechanism to enable the material receiving container in the designated material receiving container placement position to advance and pass through each raw material unit,
identify the related raw material unit through the identification unit, and
control the feeding mechanism in the related raw material unit to supply a preset feeding amount of raw materials to the material receiving container when the material receiving container meets the related raw material unit.

3. The apparatus according to claim 1, wherein
load-bearing ranges of the raw material units are different;
the load-bearing range of each raw material unit for solid raw materials is independently selected from the group consisting of less than 20,000 kg, less than 10,000 kg, less than 5,000 kg, less than 1,000 kg, less than 100 kg, less than 80 kg, less than 60 kg, less than 40 kg, less than 20 kg, less than 10 kg and less than 5 kg;
the load-bearing range of each raw material unit for liquid raw materials is independently selected from the group consisting of less than 100,000 L, less than 50,000 L, less than 20,000 L, less than 10,000 L, less than 7,000 L, less than 5,000 L, less than 5,000 L, less than 1,000 L, less than 500 L, less than 300 L, less than 150 L, less than 100 L, less than 70 L, less than 50 L, less than 30 L, less than 20 L, less than 10 L or less than 5 L.

4. The apparatus according to claim 1, wherein a capacity range of each raw material unit is 10-10,000 times of a daily recommended amount of a corresponding raw material; a conveying range of the conveying mechanism is configured to be allowed to increase or decrease the number of raw material units.

5. The apparatus according to claim 1, wherein the apparatus further comprises a material mixing mechanism, wherein the material mixing mechanism is configured to mix the different raw materials received by the material receiving container according to the preset program under the control of the control system.

6. The apparatus according to claim 5, wherein the material mixing mechanism is configured as a part of the conveying mechanism, and the material mixing mechanism is arranged in a material receiving container placement position on the conveying mechanism; the material mixing mechanism is arranged in each of the material receiving container placement positions to mix the different raw materials in the material receiving container during or after the raw material is received.

7. The apparatus according to claim 1, wherein
the apparatus further comprises a weighing device, the weighing device is configured to measure changes in the weight of a related raw material, and send weighing data to the control system in real time;
the control system controls the feeding mechanism in a corresponding related raw material unit based on the weighing data of the related raw material.

8. The apparatus according to claim 7, wherein the weighing data refers to changes in a weight of the raw materials in the material receiving container;
the weighing device is configured to begin to obtain weight increase data of the related raw material in the material receiving container when the material receiving container relatively moves to the position of the outlet of the related raw material unit, and send the weight increase data to the control system in real time;
when a difference between the weight increase data and a required quantity value of the related raw material reaches an error within an allowable range, the control system closes the feeding mechanism in a current related raw material unit and the material receiving container is relatively moved and conveyed to an outlet of a next related raw material unit.

9. The apparatus according to claim 8, the weighing data refers to a change in a weight of the raw materials in the raw material units;
the weighing device is used to obtain weight decrease data of the related raw material in the related raw material unit when the material receiving container relatively moves to the position of the outlet of the related raw material unit, and send the weight decrease data to the control system in real time;
when a difference between the weight decrease data of the related raw material and a required quantity value of the related raw material reaches an error within an allowable range, the feeding mechanism is closed, and the material receiving container is relatively moved and conveyed to an outlet of a next related raw material unit.

10. The apparatus according to claim 7, wherein the raw material units are arranged in fixed positions, the conveying mechanism is used to convey the material receiving container to the outlets of various related raw material units under the control of the control system; the weighing device as a part of the conveying mechanism is arranged in the material receiving container placement position.

11. The apparatus according to claim 1, wherein for the raw material unit used for solid raw materials, the feeding mechanism comprises a feeder and a driving device; and
for the raw material unit used for liquid raw materials, the feeding mechanism is selected from the group consisting of a metering pump, a peristaltic pump, a diaphragm pump and a rotary vane pump.

12. The apparatus according to claim 1, wherein, in the apparatus, at least two, three, four, five or all feeding mechanisms in the raw material units have different feeding accuracy; or the feeding mechanism of each of the raw material units is independently configured to have a feeding accuracy of 0.01-1 g.

13. The apparatus according to claim 1, further comprising primary raw material tanks connected to different raw material units, wherein the different raw materials are supplemented in batches to each of the different raw material units from the primary raw material tanks,
the primary raw material tanks are connected to the different raw material units through a supplementing pipeline.

14. The apparatus according to claim 1, wherein the apparatus is configured to interact information with a cloud data control center through a network to acquire and store personal data authorized by customers, and personalized formula recommended based on the personal data;
the personal data comprises body height, body weight, blood type, genes, age, allergen, taste preference and specific physiological test data;
the personalized formula comprises a formula for infant milk powder, a formula for infant complementary food, a formula for dietary additives, and a formula for beverages.

15. A system for formulating a personalized formula product, comprising the apparatus according to claim 1,
the apparatus is connected to interact information with a cloud data center through a network;
the system is configured to:
allow a customer to create an account in the system, upload a formula of the personalized formula product or upload personal information for generating the formula of the personalized formula product,
store information of all previous personalized formula products, wherein the information of the all previous personalized formula products comprises a formula, date of formulation, formulation quantity of corresponding physiological data, and video information of formulation process; and
allow the customer or a service provider authorized by the customer to acquire the formula based on the personalized formula product from the apparatus included in the system and generate the preset program to control the apparatus, so as to formulate the personalized formula product of the customer.

16. The system according to claim 15, further comprising one or more instruments selected from the group consisting of a metabolism measurement instrument, a gene testing instrument and a biochemical measurement instrument, wherein the one or more instruments are connected with the system through the network to store and send testing data of the customer according to a customer instruction, and generate a personalized formula for the customer.

17. A method for formulating a personalized formula product using the apparatus according to claim 1, comprising
step (1): providing the apparatus with a personalized formula;
step (2): generating, by the apparatus, the preset program based on the personalized formula;
step (3): providing the apparatus with a material receiving container; starting the apparatus, wherein the control system controls, according to the preset program, the conveying mechanism and the feeding mechanisms in the raw material units related to the preset program;
enabling the material receiving container to relatively move to the outlet of the first raw material units, and enabling the feeding mechanism of the first raw material unit to supply the required amount of first raw material to the material receiving container;

enabling the material receiving container to relatively move to the outlet of the second raw material unit of the preset program, and enables the feeding mechanism of the second raw material unit to supply the required amount of second raw material to the material receiving container; and keep on the operation until the preset program is completed;

specifying a receiving container placement position for each personalized recipe and extracting a position label of the receiving container placement position;

generating a corresponding preset program based on each personalized recipe;

the preset program comprises relevant raw material unit information, preset feeding amount information of each relevant raw material unit, and the position label of the receiving container placement position;

according to the preset program, the conveying mechanism is controlled to make the material receiving container placed at the receiving container placement position travel through each raw material unit, and the relevant raw material unit in the material receiving container is identified through an identifying unit, after the relevant raw material unit is connected, the control system controls the feeding mechanism in the relevant raw material unit to send a preset feeding amount of raw material to the material receiving container.

18. The method according to claim 17, wherein the preset program comprises an operating quantity or operating speed of the feeding mechanism set based on the required amount of the related raw material in the personalized formula.

19. The method according to claim 17, wherein, the control system enables the material receiving container to stay at the outlet of each raw material unit for the same period of time, and controls to start the feeding mechanism in the related raw material unit to operate at a preset operating quantity or operating speed, so as to achieve the required feeding amount of each related raw material.

20. The method according to claim 17, wherein personalized formulas are provided to the apparatus, and the apparatus generates preset programs based on the personalized formulas;

in step (3), a corresponding material receiving container is provided for each personalized formula; the material receiving containers are simultaneously arranged on the conveying mechanism in sequence, and the apparatus is started; the conveying mechanism simultaneously conveys the material receiving containers, and the material receiving containers stay at the outlets of various raw material units for the same period of time and then continues to advance;

when the material receiving container corresponding to one preset program advances to the outlet of the related raw material unit, the control system controls to start the feeding mechanism to operate at a preset operating quantity or operating speed, so as to achieve the required feeding amount of the related raw material; and when the material receiving container advances to the outlet of an unrelated raw material unit, the feeding mechanism is not started.

21. The method according to claim 17, wherein the apparatus is connected to interact information with a cloud data center through a network;

a data storage space is provided in the apparatus to:

allow a customer to create an account, upload the personalized formula or upload personal information for generating a personalized nutritional formula, store information of all previous personalized nutritional formula products comprising personalized formula, date of formulation, formulation quantity, and video information of formulation process, and allow the customer or a service provider authorized by the customer to acquire the personalized nutritional formula from the apparatus and generate a personalized control program to control the apparatus, so as to formulate a personalized nutritional formula product of the customer;

wherein the related raw material contained in a part of the raw material units is one raw material or a mixture of multiple raw materials.

* * * * *